US011887332B2

(12) United States Patent
Krishnamurthy et al.

(10) Patent No.: US 11,887,332 B2
(45) Date of Patent: Jan. 30, 2024

(54) ITEM IDENTIFICATION USING DIGITAL IMAGE PROCESSING

(71) Applicant: 7-Eleven, Inc., Irving, TX (US)

(72) Inventors: Sailesh Bharathwaaj Krishnamurthy, Irving, TX (US); Sumedh Vilas Datar, Grapevine, TX (US); Shantanu Yadunath Thakurdesai, Denton, TX (US); Crystal Maung, Dallas, TX (US)

(73) Assignee: 7-ELEVEN, INC., Irving, TX (US)

( * ) Notice: Subject to any disclaimer, the term of this patent is extended or adjusted under 35 U.S.C. 154(b) by 380 days.

(21) Appl. No.: 17/362,261

(22) Filed: Jun. 29, 2021

(65) Prior Publication Data
US 2022/0414924 A1 Dec. 29, 2022

(51) Int. Cl.
G06T 7/73 (2017.01)
G06T 7/55 (2017.01)
G06N 20/00 (2019.01)
H04N 23/90 (2023.01)

(52) U.S. Cl.
CPC ............... G06T 7/74 (2017.01); G06N 20/00 (2019.01); G06T 7/55 (2017.01); H04N 23/90 (2023.01)

(58) Field of Classification Search
CPC . G06T 7/74; G06T 7/55; G06N 20/00; H04N 23/90; G06V 20/44; G06V 20/64; G06V 20/52
See application file for complete search history.

(56) References Cited

U.S. PATENT DOCUMENTS

| 10,133,933 | B1* | 11/2018 | Fisher | G06V 20/41 |
| 2013/0223673 | A1 | 8/2013 | Davis et al. | |
| 2013/0248593 | A1 | 9/2013 | Bonner et al. | |
| 2017/0161987 | A1* | 6/2017 | Bulzacki | G07F 17/3241 |
| 2019/0108396 | A1* | 4/2019 | Dal Mutto | G06F 18/24 |
| 2021/0295491 | A1* | 9/2021 | Hyatt | G06V 10/25 |
| 2021/0326544 | A1* | 10/2021 | Jackson | G06K 19/0723 |

(Continued)

FOREIGN PATENT DOCUMENTS

CN 109330284 A * 2/2019 ............. A47F 10/00

OTHER PUBLICATIONS

Korpusik, M. "Deep learning for spoken dialogue systems : application to nutrition" Thesis: Ph. D., Massachusetts Institute of Technology, Department of Electrical Engineering and Computer Science, 2019 (Year: 2019).*

(Continued)

Primary Examiner — Mia M Thomas
(74) Attorney, Agent, or Firm — BAKER BOTTS L.L.P.

(57) ABSTRACT

A device configured to detect a triggering event at a platform and to capture a depth image of items on the platform using a three-dimensional (3D) sensor. The device is further configured to determine an object pose for each item on the platform and to identify one or more cameras from among a plurality of cameras based on the object pose for each item on the platform. The device is further configured to capture one or more images of the items on the platform using the identified cameras and to identify items within the one or more images based on features of the items. The device is further configured to identify a user associated with the identified items on the platform, to identify an account that is associated with the user, and to associate the identified items with the account of the user.

42 Claims, 7 Drawing Sheets

(56) References Cited

U.S. PATENT DOCUMENTS

| | | | | |
|---|---|---|---|---|
| 2021/0358042 | A1* | 11/2021 | Wang | G06N 3/045 |
| 2022/0058381 | A1* | 2/2022 | Ionescu | G06V 10/25 |
| 2022/0343308 | A1* | 10/2022 | Yang | G06T 7/50 |
| 2022/0414373 | A1* | 12/2022 | Krishnamurthy | G06V 10/778 |
| 2022/0414374 | A1* | 12/2022 | Krishnamurthy | G01G 21/22 |
| 2022/0414375 | A1* | 12/2022 | Krishnamurthy | G06N 3/08 |
| 2022/0414378 | A1* | 12/2022 | Datar | G06T 7/73 |
| 2022/0414379 | A1* | 12/2022 | Krishnamurthy | G06T 7/60 |
| 2022/0414398 | A1* | 12/2022 | Krishnamurthy | G06V 10/454 |
| 2022/0414399 | A1* | 12/2022 | Datar | H04N 13/207 |
| 2022/0414899 | A1* | 12/2022 | Datar | G06N 20/00 |
| 2022/0414900 | A1* | 12/2022 | Datar | G06V 10/25 |
| 2023/0252444 | A1* | 8/2023 | Bjelcevic | G06V 10/774 |
| | | | | 705/23 |
| 2023/0252609 | A1* | 8/2023 | McDaniel | G06Q 20/208 |
| | | | | 382/103 |

OTHER PUBLICATIONS

Song, J. "A perception pipeline exploiting trademark databases for service robots" Thesis, School of Information Technology and Electrical Engineering, The University of Queensland, 2020 (Year: 2019).*

Partial Search Report for PCT Patent Application No. PCT/US2022/072832, dated Oct. 6, 2022; 12 pages.

* cited by examiner

ITEM IDENTIFICATION USING DIGITAL IMAGE PROCESSING

TECHNICAL FIELD

The present disclosure relates generally to digital image processing, and more specifically to item identification using digital image processing.

BACKGROUND

Identifying and tracking objects within a space poses several technical challenges. Conventional systems may use various image processing techniques to identify objects. For example, these systems may identify different features of an item that can be used to later identify the item in an image. This process is computationally intensive when the image includes several items. For example, identifying an item in an image with multiple items involves identifying an individual item within the image and then comparing the features for an item against every item in a database of items. In addition to being computationally intensive, this process requires a significant amount of time which means that this process is not compatible with real-time applications. This problem becomes intractable when trying to simultaneously identify and track multiple items.

SUMMARY

The system disclosed in the present application provides a technical solution to the technical problems discussed above by using a combination of cameras and three-dimensional (3D) sensors to identify and track items that are placed on a platform. The disclosed system provides several practical applications and technical advantages which include a process for selecting a combination of cameras on an imaging device to capture images of items that are placed on a platform, identifying the items that are placed on the platform, and assigning the items to a user. Existing systems typically require a user to scan or manually identify items, which creates a bottleneck in the system's ability to quickly identify items. In contrast, the disclosed process is able to identify items from images of the items and assign the items to a user without requiring the user to scan or otherwise identify the items. This process provides a practical application by improving the system's ability to quickly identify multiple items. These practical applications not only improve the system's ability to identify items but also improve the underlying network and the devices within the network. For example, this disclosed process allows the system to service a larger number of users by reducing the amount of time that it takes to identify items and assign items to a user. In other words, this process improves hardware utilization without requiring additional hardware resources which increases the number of hardware resources that are available for other processes and increases the throughput of the system. Additionally, these technical improvements allow for scaling of the item identification and tracking functionality described herein.

In one embodiment, the item tracking system comprises an item tracking device that is configured to detect a triggering event at a platform of an imaging device. The triggering event may correspond with when a user approaches or interacts with the imaging device by placing items on the platform. The item tracking device is configured to capture a depth image of items on the platform using a 3D sensor and to determine an object pose for each item on the platform based on the depth image. The pose corresponds with the location and the orientation of an item with respect to the platform. The item tracking device is further configured to identify one or more cameras from among a plurality of cameras on the imaging device based on the object pose for each item on the platform. This process allows the item tracking device to select the cameras with the best views of the items on the platform which reduces the number of images that are processed to identify the items. The item tracking device is further configured to capture images of the items on the platform using the identified cameras and to identify the items within the images based on features of the items. The item tracking device is further configured to identify a user associated with the identified items on the platform, to identify an account that is associated with the user, and to add the items to the account that is associated with the user.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
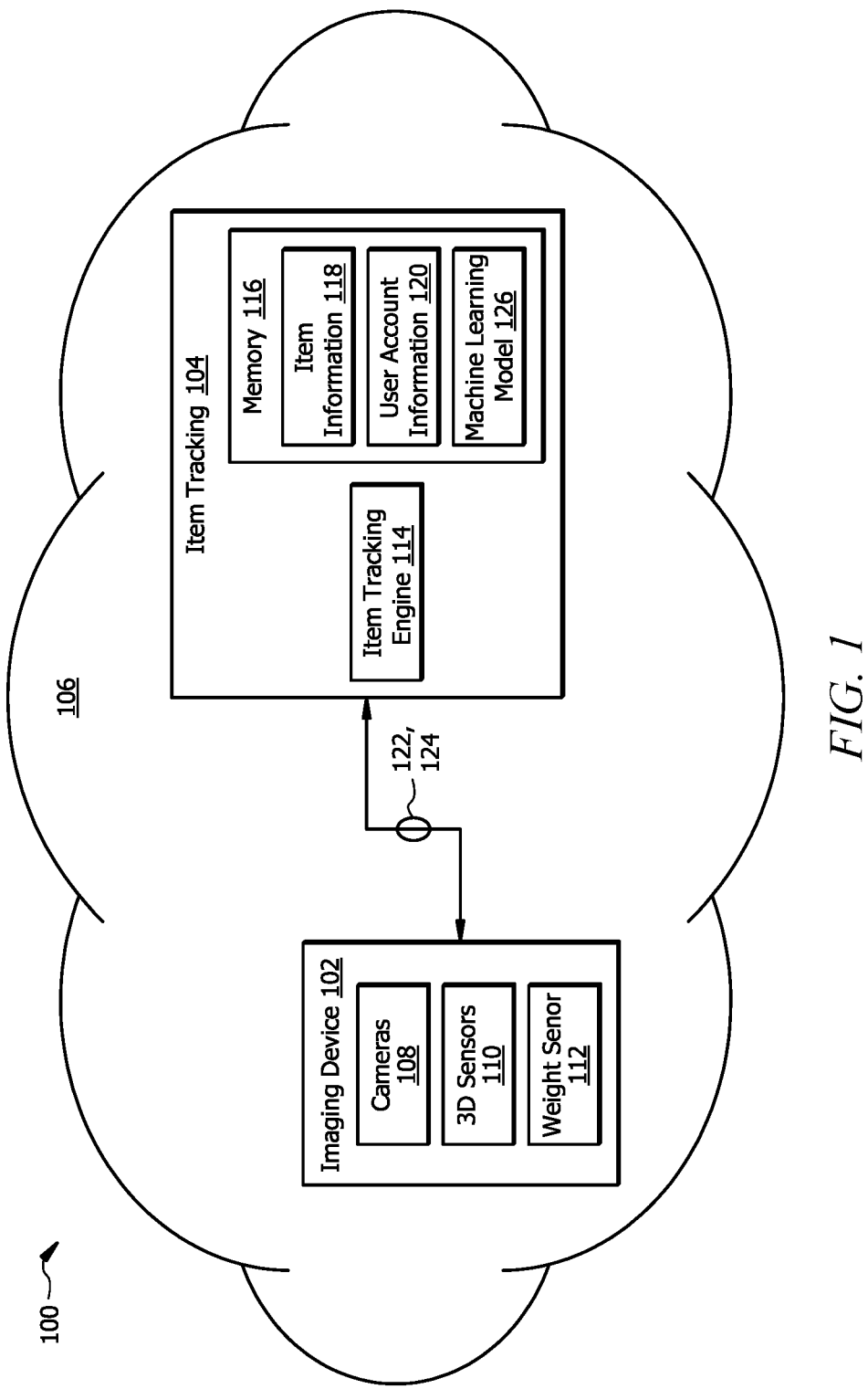
FIG. 1 is a schematic diagram of an embodiment of an item tracking system that is configured to employ digital image processing.

FIG. 1 is a schematic diagram of an embodiment of an item tracking system 100 that is configured to employ digital image processing. The item tracking system 100 may employ digital image processing to identify items 204 that are placed on a platform 202 of an imaging device 102 and to assign the items 204 to a particular user. This process allows the user to obtain items 204 from a space without requiring the user to scan or otherwise manually identify the items 204 they would like to take. In one embodiment, the item tracking system 100 may be installed in a space (e.g. a store) so that shoppers need not engage in the conventional checkout process. Although the example of a store is used in this disclosure, this disclosure contemplates that the item tracking system 100 may be installed and used in any type of physical space (e.g. a room, an office, an outdoor stand, a mall, a supermarket, a convenience store, a pop-up store, a warehouse, a storage center, an amusement park, an airport, an office building, etc.). As an example, the space may be a store that comprises a plurality of items 204 that are available for purchase. The item tracking system 100 may be installed in the store so that shoppers need not engage in the conventional checkout process to purchase items from the store. In this example, the store may be a convenience store or a grocery store. In other examples, the store may not be a physical building, but a physical space or environment where shoppers may shop. For example, the store may be a "grab-and-go" pantry at an airport, a kiosk in an office building, an outdoor market at a park, etc. As another example, the space may be a warehouse or supply room that comprises a plurality of items 204 that are available for a user to use or borrow. In this example, the item tracking system 100 may be installed to allow users to checkout parts or supplies by themselves. In other examples, the item tracking system 100 may be employed for any other suitable application.

In one embodiment, the item tracking system 100 comprises one or more imaging devices 102 and an item tracking device 104 that are in signal communication with each other over a network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

Imaging Devices

The imaging device 102 is generally configured to capture images 122 and depth images 124 of items 204 that are placed on a platform 202 of the imaging device 102. In one embodiment, the imaging device 102 comprises one or more cameras 108, one or more three-dimensional (3D) sensors 110, and one or more weight sensors 112. Additional information about the hardware configuration of the imaging device 102 is described in FIGS. 2A-2C.

The cameras 108 and the 3D sensors 110 are each configured to capture images 122 and depth images 124 of at least a portion of the platform 202. The cameras 108 are configured to capture images 122 (e.g. RGB images) of items 204. Examples of cameras 108 include, but are not limited to, cameras, video cameras, web cameras, and printed circuit board (PCB) cameras. The 3D sensors 110 are configured to capture depth images 124 (e.g. depth maps or point clouds) of items. Examples of 3D sensors 110 include, but are not limited to, depth-sensing cameras, time-of-flight sensors, LiDARs, structured light cameras, or any other suitable type of depth sensing device. In some embodiments, a camera 108 and a 3D sensor 110 be integrated within a single device. In other embodiments, a camera 108 and a 3D sensor 110 be distinct devices.

The weight sensors 112 are configured to measure the weight of items 204 that are placed on the platform 202 of the imaging device 102. For example, a weight sensor 112 may comprise a transducer that converts an input mechanical force (e.g. weight, tension, compression, pressure, or torque) into an output electrical signal (e.g. current or voltage). As the input force increases, the output electrical signal may increase proportionally. The item tracking device 104 is configured to analyze the output electrical signal to determine an overall weight for the items 204 on the weight sensor 112. Examples of weight sensors 112 include, but are not limited to, a piezoelectric load cell or a pressure sensor. For example, a weight sensor 112 may comprise one or more load cells that are configured to communicate electrical signals that indicate a weight experienced by the load cells. For instance, the load cells may produce an electrical current that varies depending on the weight or force experienced by the load cells. The load cells are configured to communicate the produced electrical signals to item tracking device 104 for processing.

Item Tracking Device

Examples of the item tracking device 104 include, but are not limited to, a server, a computer, a laptop, a tablet, or any other suitable type of device. In FIG. 1, the imaging device 102 and the item tracking device 104 are shown as two devices. In some embodiments, the imaging device 102 and the item tracking device 104 may be integrated within a single device. In one embodiment, the item tracking device 104 comprises an item tracking engine 114 and a memory 116. Additional details about the hardware configuration of the item tracking device 104 are described in FIG. 6. The memory 116 is configured to store item information 118, user account information 120, a machine learning model 126, and/or any other suitable type of data.

In one embodiment, the item tracking engine 114 is generally configured to process images 122 and depth images 124 to identify items 204 that are placed on the platform 202 of the imaging device 102 and to associate the identified items 204 with a user. An example of the item tracking engine 114 in operation is described in more detail below in FIG. 3.

The item information 118 generally comprises information that is associated with a plurality of items. Examples of item information 118 include, but are not limited to, prices, weights, barcodes, item identifiers, item numbers, features of items, or any other suitable information that is associated with an item 204. Examples of features of an item include, but are not limited to, text, logos, branding, colors, barcodes, patterns, a shape, or any other suitable type of attributes of an item 204. The user account information 120 comprises information for one or more accounts that are associated with a user. Examples of accounts include, but are not limited to, a customer account, an employee account, a school account, a business account, a financial account, a digital cart, or any other suitable type of account. The user account information 120 may be configured to associate user information with accounts that are associated with a user. Examples of user information include, but are not limited to, a name, a phone number, an email address, an identification number, an employee number, an alphanumeric code, reward membership information, or any other suitable type of information that is associated with the user. In some embodiments, the item information 118 and/or the user account information 120 may be stored in a device (e.g. a cloud server) that is external from the item tracking device 104.

Examples of machine learning models 126 include, but are not limited to, a multi-layer perceptron, a recurrent neural network (RNN), an RNN long short-term memory (LSTM), a convolution neural network (CNN), a transformer, or any other suitable type of neural network model. In one embodiment, the machine learning model 126 is generally configured to receive an image 122 as an input and to output an item identifier based on the provided image 122. The machine learning model 126 is trained using supervised learning training data that comprises different images 122 of items 204 with their corresponding labels (e.g. item identifiers). During the training process, the machine learning model 126 determines weights and bias values that allow the machine learning model 126 to map images 122 of items 204 to different item identifiers. Through this process, the machine learning model 126 is able to identify items 204 within an image 122. The item tracking engine 114 may be configured to train the machine learning models 126 using any suitable technique as would be appreciated by one of ordinary skill in the art. In some embodiments, the machine learning model 126 may be stored and/or trained by a device that is external from the item tracking device 104.

Hardware Configuration for the Imaging Device

Figure 2A:
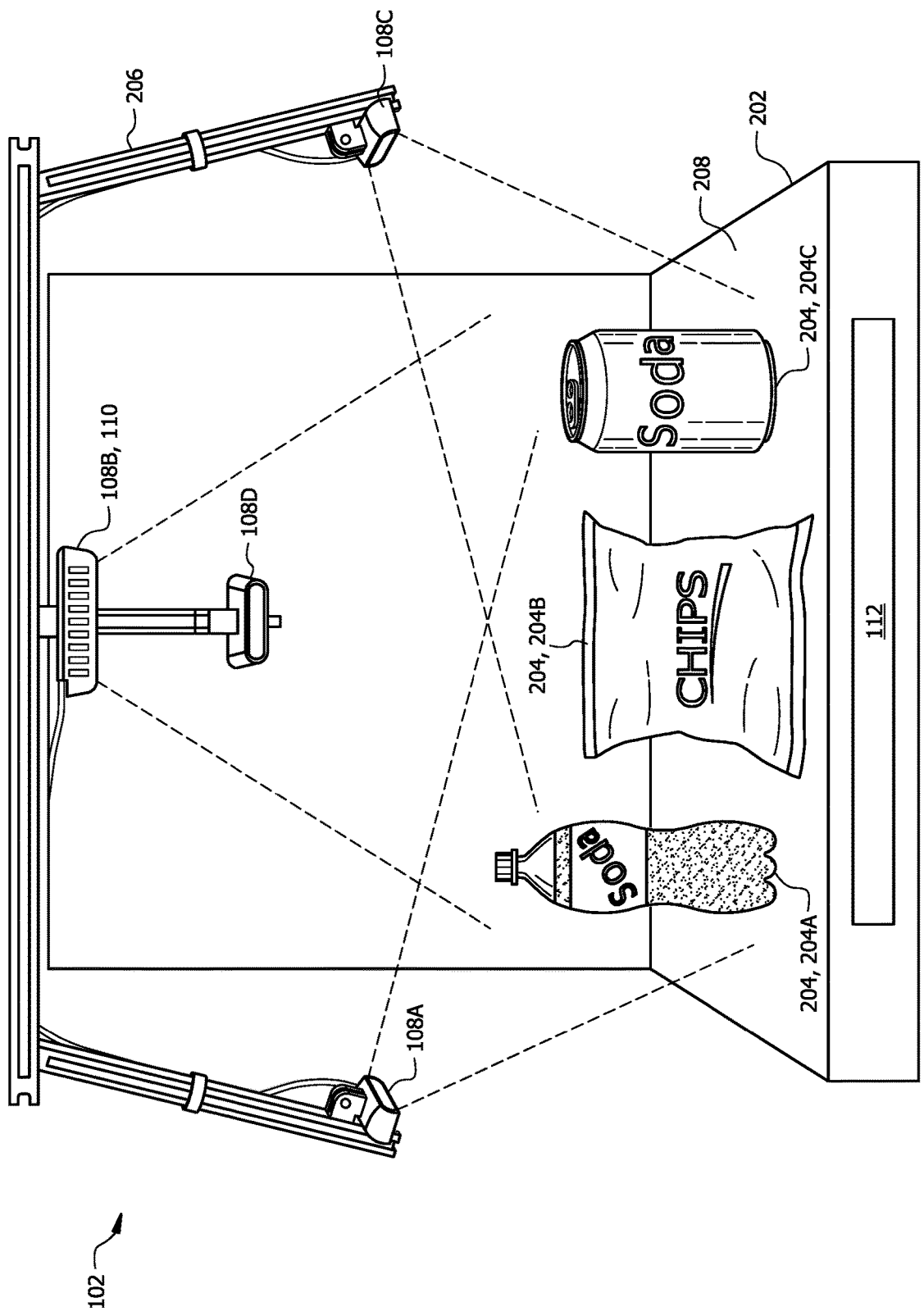
FIG. 2A is a perspective view of an embodiment of an imaging device.

FIG. 2A is a perspective view of an embodiment of an imaging device 102. In this example, the imaging device 102 comprises a platform 202, a frame structure 206, a plurality of cameras 108, a plurality of 3D sensors 110, and a weight sensor 112. The imaging device 102 may be configured as shown in FIG. 2A or in any other suitable configuration. In some embodiments, the imaging device 102 may further comprise additional components including, but not limited to, light, displays, and graphical user interfaces.

The platform 202 comprises a surface 208 that is configured to hold a plurality of items 204. In some embodiments, the platform 202 may be integrated with the weight sensor 112. For example, the platform 202 may be positioned on the weight sensor 112 which allows the weight sensor 112 to measure the weight of items 204 that are placed on the platform 202. As another example, the weight sensor 112 may be disposed within the platform 202 to measure the weight of items 204 that are placed on the platform 202. In some embodiments, at least a portion of the surface 208 may be transparent. In this case, a camera 108 or scanner (e.g. a barcode scanner) may be disposed below the surface 208 of the platform 202 and configured to capture images 122 or scan the bottoms of items 204 placed on the platform 202. For instance, a camera 108 or scanner may be configured to identify and read product labels and/or barcodes (e.g. stockkeeping units (SKUs)) of items 204 through the transparent surface 208 of the platform 202. The platform 202 may be formed of aluminum, metal, wood, plastic, glass, or any other suitable material.

The frame structure 206 is generally configured to support and position cameras 108 and 3D sensors 110. In FIG. 2A, the frame structure 206 is configured to position a first camera 108A and a second camera 108C on the sides of the imaging device 102 with a perspective view of the items 204 on the platform 202. The frame structure 206 is further configured to position a third camera 108D on the back side of the imaging device 102 with a perspective view of the items 204 on the platform 202. In some embodiments, the frame structure 206 may further comprise a fourth camera 108 (not shown) on the front side of the imaging device 102 with a perspective view of items 204 on the platform 202. The frame structure 206 may be configured to use any number and combination of the side cameras 108A and 108C, the back side camera 108D, and the front side camera 108. For example, one or more of the identified cameras 108 may be optional and omitted. A perspective image 122 or depth image 124 is configured to capture the side-facing surfaces of items 204 placed on the platform 202. The frame structure 206 is further configured to position a third camera 108B and a 3D sensor 110 with a top view or overhead view of the items 204 on the platform 202. An overhead image 122 or depth image 124 is configured to capture upward-facing surfaces of items 204 placed on the platform 202. In other examples, the frame structure 206 may be configured to support and position any other suitable number and combination of cameras 108 and 3D sensors 110. The frame structure 206 may be formed of aluminum, metal, wood, plastic, or any other suitable material.

Figure 2B:
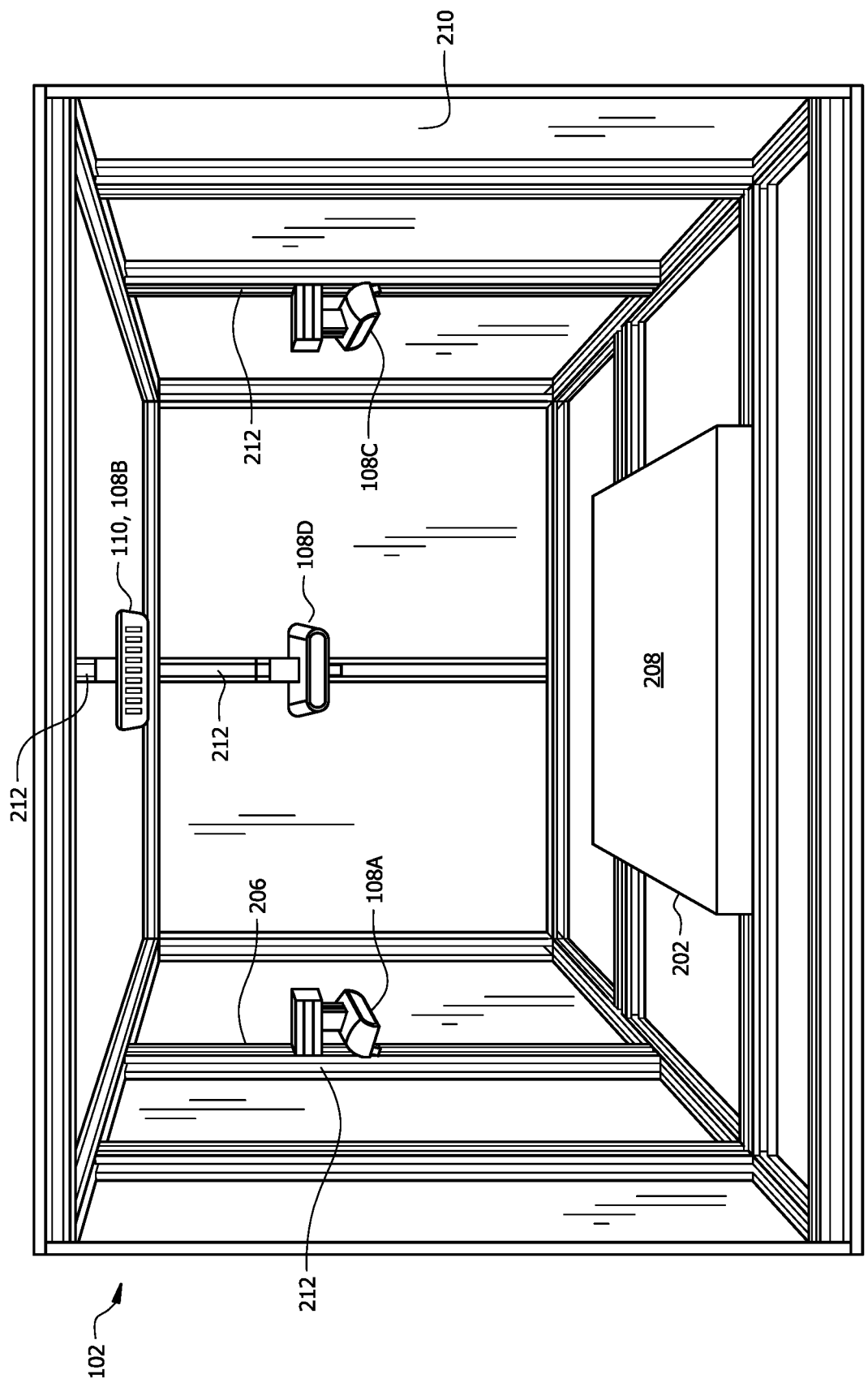
FIG. 2B is a perspective view of another embodiment of an imaging device with an enclosure.

FIG. 2B is a perspective view of another embodiment of an imaging device 102 with an enclosure 210. In this configuration, the enclosure 210 is configured to at least partially encapsulate the frame structure 206, the cameras 108, the 3D sensors 110, and the platform 202 of the imaging device 102. The frame structure 206, the cameras 108, the 3D sensors 110, and the platform 202 may be configured similar to as described in FIG. 2A. In one embodiment, the frame structure 206 may further comprise rails or tracks 212 that are configured to allow the cameras 108 and the 3D sensors 110 to be repositionable within the enclosure 210. For example, the cameras 108A, 108C, and 108D may be repositionable along a vertical axis with respect to the platform 202 using the rails 212. Similarly, camera 108B and 3D sensor 110 may be repositionable along a horizontal axis with respect to the platform 212 using the rails 212.

Figure 2C:
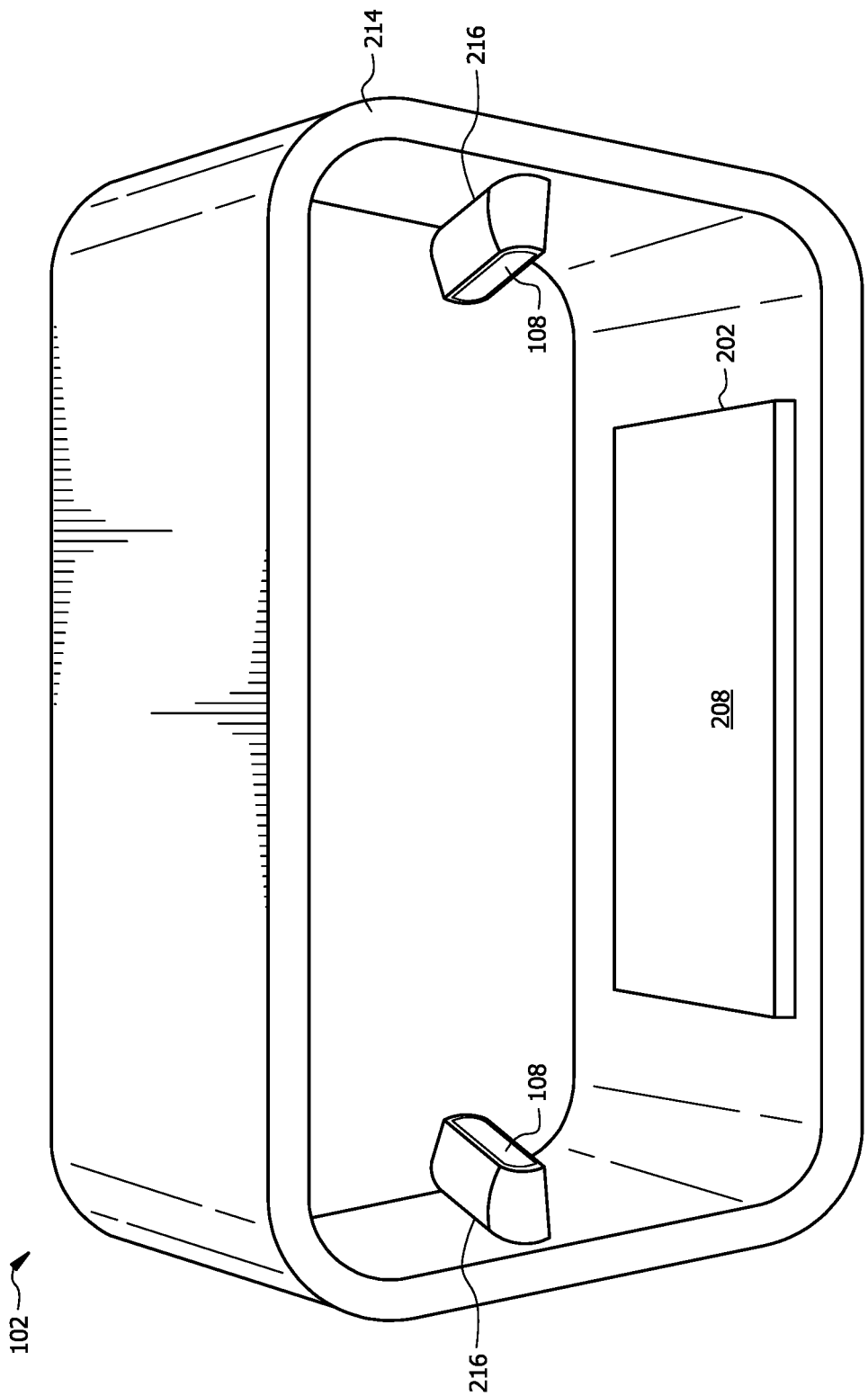
FIG. 2C is a perspective view of another embodiment of an imaging device with an open enclosure.

FIG. 2C is a perspective view of another embodiment of an imaging device 102 with an open enclosure 214. In this configuration, the enclosure 214 is configured to at least partially cover the frame structure 206, the cameras 108, the 3D sensors 110, and the platform 202 of the imaging device 102. The frame structure 206, the cameras 108, the 3D sensors 110, and the platform 202 may be configured similar to as described in FIG. 2A. In one embodiment, the frame structure 206 may be integrated within the enclosure 214. For example, the enclosure 214 may comprise openings 216 that are configured to house the cameras 108 and the 3D sensors 110. In FIG. 2C, the enclosure 214 has a rectangular cross section with rounded edges. In other embodiments, the enclosure 214 may be configured with any other suitable shape cross section.

An Item Tracking Process

Figure 3:
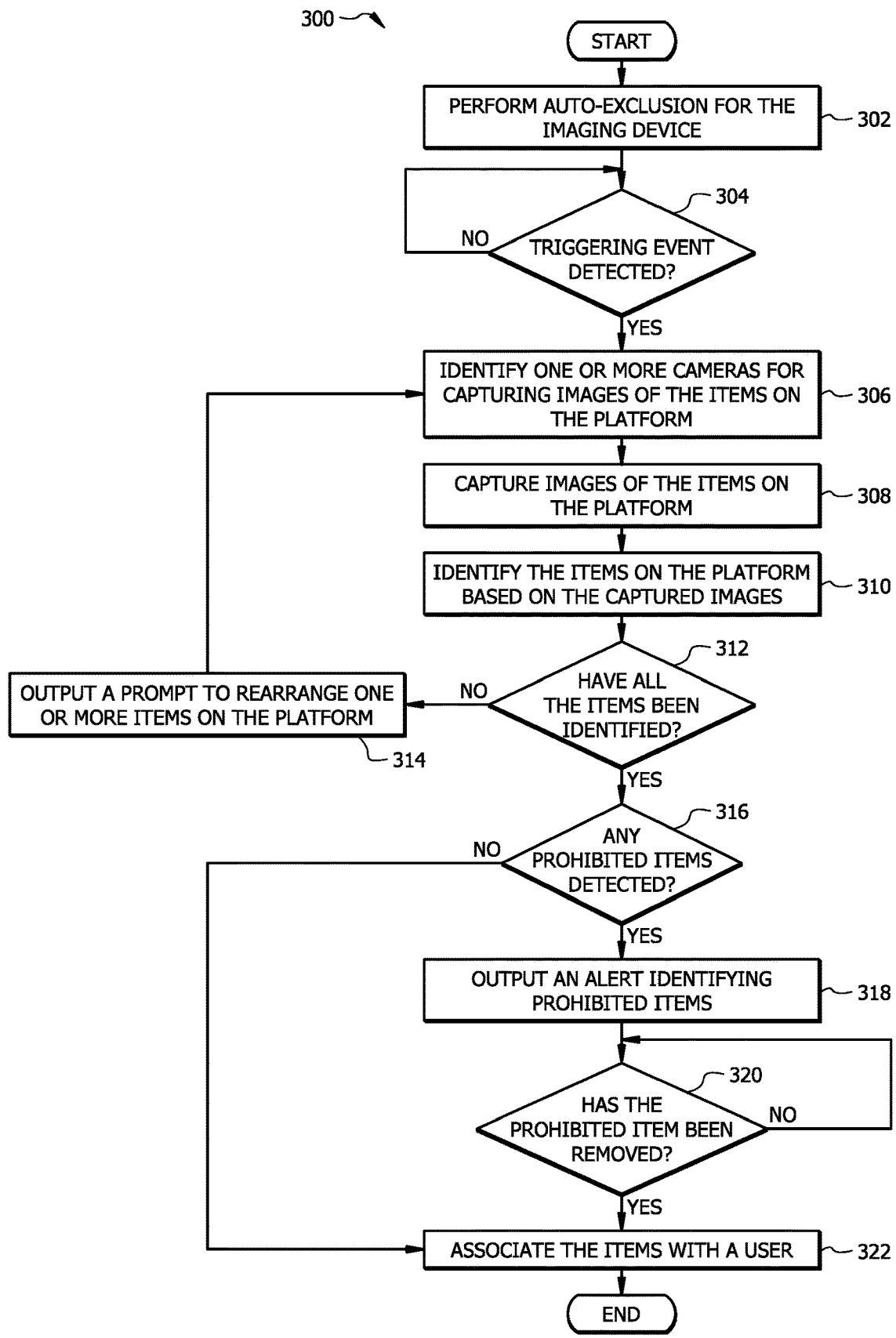
FIG. 3 is a flowchart of an embodiment of an item tracking process for the item tracking system.

FIG. 3 is a flowchart of an embodiment of an item tracking process 300 for the item tracking system 100. The item tracking system 100 may employ process 300 to identify items 204 that are placed on the platform 202 of an imaging device 102 and to assign the items 204 to a particular user. As an example, the item tracking system 100 may employ process 300 within a store to add items 204 to a user's digital cart for purchase. As another example, the item tracking system 100 may employ process 300 within a warehouse or supply room to check out items to a user. In other examples, the item tracking system 100 may employ process 300 in any other suitable type of application where items 204 are assigned or associated with a particular user. This process allows the user to obtain items 204 from a space without having the user scan or otherwise identify the items 204 they would like to take.

At step 302, the item tracking device 104 performs auto-exclusion for the imaging device 102. During an initial calibration period, the platform 202 may not have any items 204 placed on the platform 202. During this period of time, the item tracking device 104 may use one or more cameras 108 and 3D sensors 110 to capture reference images 122 and reference depth images 124 of the platform without any items 204 placed on the platform 202. The item tracking device 104 can then use the captured images 122 and depth images 124 as reference images to detect when an item is placed on the platform 202. For example, the item tracking device 104 may use a 3D sensor 110 that is configured with a top view or overhead view of the platform 202 to capture a reference depth image 124 of the platform 202 when no items 204 are placed on the platform 202. In this example, the captured depth image 124 may comprise a substantially constant depth value throughout the depth image 124 that corresponds with the surface 208 of the platform 202. At a later time, the item tracking device 104 can detect that an item 204 has been placed on the surface 208 of the platform 202 based on differences in depth values between subsequent depth images 124 and the reference depth image 124. As another example, the item tracking device 104 may use a camera 108 that is configured with a top view or a perspective view of the platform 202 to capture a reference image 122 of the platform when no items 204 are placed on the platform 202. In this example, the captured image 122 comprises pixel values that correspond with a scene of the platform when no items 204 are present on the platform 202. At a later time, the item tracking device 104 can detect that an item 204 has been placed on the platform 202 based on differences in the pixel values between subsequent images 122 and the reference image 122.

Figure 4:
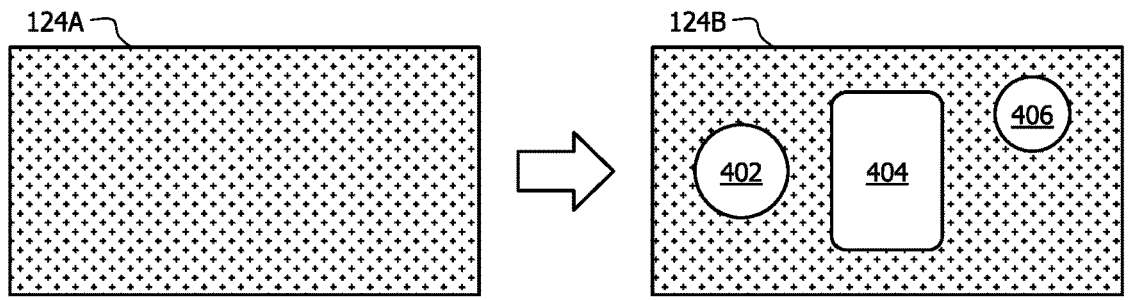
FIG. 4 is an example of a comparison of depth images of a platform of the imaging device before and after placing items on the platform.

At step 304, the item tracking device 104 determines whether a triggering event has been detected. A triggering event corresponds with an event that indicates that a user is interacting with the imaging device 102. For instance, a triggering event may occur when a user approaches the imaging device 102 or places an item 204 on the imaging device 102. As an example, the item tracking device 104 may determine that a triggering event has occurred in response to detecting motion using a 3D sensor 110 or based on changes in depths images 124 captured by a 3D sensor 110. For example, the item tracking device 104 can detect that an item 204 has been placed on the surface 208 of the platform 202 based on differences in depth values between depth images 124 captured by a 3D sensor 110 and the reference depth image 124. Referring to FIG. 4 as an example, FIG. 4 shows an example of a comparison between depth images 124 from an overhead view of the platform 202 of the imaging device 102 before and after placing items 204 shown in FIG. 2A on the platform 202. Depth image 124A corresponds with a reference depth image 124 that is captured when no items 204 are placed on the platform 202. Depth image 124B corresponds with a depth image 124 that is captured after items 204 are placed on the platform 202. In this example, the colors or pixel values within the depth images 124 represent different depth values. In depth image 124A, the depth values in the depth image 124A are substantially constant which means that there are no items 204 on the platform 202. In depth image 124B, the different depth values correspond with the items 204 (i.e. items 204A, 204B, and 204C) that are placed on the platform 202. In this example, the item tracking device 104 detects a triggering event in response to detecting the presence of the items 204 on the platform 202 based on differences between depth image 124A and depth image 124B. The item tracking device 104 may also use an image 122 or depth image 124 to count the number of items 204 that are on the platform 202. In this example, the item tracking device 104 determines that there are three items 204 placed on the platform 202 based on the depth image 124B. The item tracking device 104 may use the determined number of items 204 later to confirm whether all of the items 204 have been identified. This process is discussed in more detail below in step 312.

As another example, the item tracking device 104 may determine that a triggering event has occurred in response to detecting motion using a camera 108 or based on changes in images 122 captured by a camera 108. For example, the item tracking device 104 can detect that an item 204 has been placed on the platform 202 based on differences in the pixel values between subsequent images 122 and the reference image 122. As another example, the item tracking device 104 may determine that a triggering event has occurred in response to a weight increase on the weight sensor 112 of the imaging device 102. In this case, the increase in weight measured by the weight sensor 112 indicates that one or more items 204 have been placed on the platform 202. In other examples, the item tracking device 104 may use any other suitable type of sensor or technique for detecting when a user approaches the imaging device 102 or places an item 204 on the imaging device 102.

The item tracking device 104 remains at step 304 in response to determining that a triggering event has not been detected. In this case, the item tracking device 104 determines that a user has not interacted with the imaging device 102 yet. The item tracking device 104 will remain at step 304 to continue to check for triggering events until a user begins interacting with the imaging device 102. The item tracking device 104 proceeds to step 306 in response to determining that a triggering event has been detected. In this case, the item tracking device 104 determines that a user has begun interacting with the imaging device 102. The item tracking device 104 proceeds to step 306 to begin identifying items that are placed on the platform 202 of the imaging device 102.

At step 306, the item tracking device 104 identifies one or more cameras 108 for capturing images 122 of the items 204 on the platform 202 of the imaging device 102. The item tracking device 104 may identify cameras 108 for capturing images 122 of the items 204 based at least in part upon the pose (e.g. location and orientation) of the items 204 on the platform 202. The pose of an item 204 corresponds with the location the item 204 and how the item 204 is positioned with respect to the platform 202. Referring to the example in FIG. 2A, a first item 204A and a second item 204C are positioned in a vertical orientation with respect to the platform 202. In the vertical orientation, the identifiable features of an item 204 are primarily in the vertical orientation. Cameras 108 with a perspective view, such as cameras 108A and 108C, may be better suited for capturing images 122 of the identifiable features of item 204 that are in a vertical orientation. For instance, the item tracking device 104 may select camera 108A to capture images 122 of item 204A since most of the identifiable features of item 204A, such as branding, text, and barcodes, are located on the sides of the item 204A and are most visible using a perspective view of the item 204. Similarly, the item tracking device 104 may then select camera 108C to capture images 122 of item 204C. In this example, a third item 204B is positioned in a horizontal orientation with respect to the platform 202. In the horizontal orientation, the identifiable features of an item 204 are primarily in the horizontal orientation. Cameras 108 with a top view or overhead view, such as camera 108B, may be better suited for capturing images 122 of the identifiable features of item 204 that are in a horizontal orientation. In this case, the item tracking device 104 may select camera 108B to capture images 122 of item 204B since most of the identifiable features of item 204B are located on the top of the item 204B and are most visible from using an overhead view of the item 204B.

In one embodiment, the item tracking device 104 may determine the pose of items 204 on the platform 202 using depth images 124. Referring to FIG. 4 as an example, the depth image 124B corresponds with an overhead depth image 124 that is captured after the items 204 shown in FIG. 2A (i.e. items 204a, 204B, and 204C) are placed on the platform 202. In this example, the item tracking device 104 may use areas in the depth image 124B that correspond with each item 204 to determine the pose of the items 204. For example, the item tracking device 104 may determine the area 402 within the depth image 124B that corresponds with item 204A. The item tracking device 104 compares the determined area 402 to a predetermined area threshold value 614. The item tracking device 104 determines that an item 204 is in a vertical orientation when the determined area 402 for the item 204 is less than or equal to the predetermined area threshold value 614. Otherwise, the item tracking device 104 determines that the item 204 is in a horizontal orientation when the determined area 402 for the item 204 is greater than the predetermined area threshold value 614. In this example, the item tracking device 104 determines that items 204A and 204C are in a vertical orientation because their areas 402 and 406, respectively, are less than or equal to the area threshold value 614. The item tracking device 104 determines that item 204B is in a horizontal orientation because its area 404 is greater than the area threshold value 614. This determination means that the item tracking device 104 will select cameras 108 (e.g. cameras 108A and 108C) with a perspective view of the platform 202 to capture images 122 of items 204A and 204C. The item tracking device 104 will select a camera 108 (e.g. camera 108B) with a top view or overhead view of the platform 202 to capture images 122 of item 204B.

In one embodiment, the item tracking device 104 may identify a camera 108 for capturing images 122 of an item 204 based at least in part on the distance between the item 204 and the camera 108. For example, the item tracking device 104 may generate homographies 608 between the cameras 108 and/or the 3D sensors 110 of the imaging device 102. By generating a homography 608 the item tracking device 104 is able to use the location of an item 204 within an image 122 to determine the physical location of the item 204 with respect to the platform 202, the cameras 108, and the 3D sensors 110. This allows the item tracking device 104 to use the physical location of the item 204 to determine distances between the item 204 and each of the cameras 108 and 3D sensors 110. A homography 608 comprises coefficients that are configured to translate between pixel locations in an image 122 or depth image 124 and (x,y) coordinates in a global plane (i.e. physical locations on the platform 202). The item tracking device 104 uses homographies 608 to correlate between a pixel location in a particular camera 108 or 3D sensor 110 with a physical location on the platform 202. In other words, the item tracking device 104 uses homographies 608 to determine where an item 204 is physically located on the platform 202 based on their pixel location within an image 122 or depth image 124 from a camera 108 or a 3D sensor 110, respectively. Since the item tracking device 104 uses multiple cameras 108 and 3D sensors 110 to monitor the platform 202, each camera 108 and 3D sensor 110 is uniquely associated with a different homography 608 based on the camera's 108 or 3D sensor's 110 physical location on the imaging device 102. This configuration allows the item tracking device 104 to determine where an item 204 is physically located on the platform 202 based on which camera 108 or 3D sensor 110 it appears in and its location within an image 122 or depth image 124 that is captured by that camera 108 or 3D sensor 110. Additional information about generating a homography 608 and using a homography 608 is disclosed in U.S. Pat. No. 11,023,741 entitled, "DRAW WIRE ENCODER BASED HOMOGRAPHY" which is hereby incorporated by reference herein as if reproduced in its entirety.

As an example, the item tracking device 104 may use an image 122 or a depth image 124 from a camera 108 or 3D sensor 110, respectively, with a top view or overhead view of the platform 202 to determine the physical location of an item on the platform 202. In this example, the item tracking device 104 may determine a pixel location for the item 204 within the image 122 or depth image 124. The item tracking device 104 may then use a homography 608 to determine the physical location for the item 204 with respect to the platform 202 based on its pixel location. After determining the physical location of the item 204 on the platform 202, the item tracking device 104 may then identify which camera 108 is physically located closest to the item 204 and select the identified camera 108. Returning to the example in FIG. 2A, the item tracking device 104 may select camera 108A to capture images 122 of item 204A since camera 108A is closer to item 204A than camera 108C. Similarly, the item tracking device 104 may select camera 108C to capture images 122 of item 204C since camera 108C is closer to item 204C than camera 108A. This process ensures that the camera 108 with the best view of an item 204 is selected to capture an image 122 of the item 204.

Figure 5A:
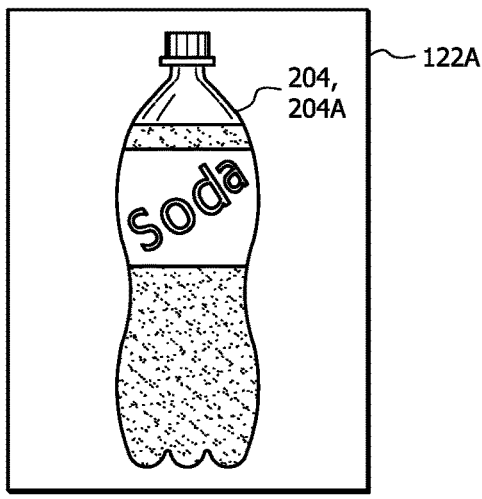
FIGS. 5A-5C are examples of images of items.
Figure 5B:
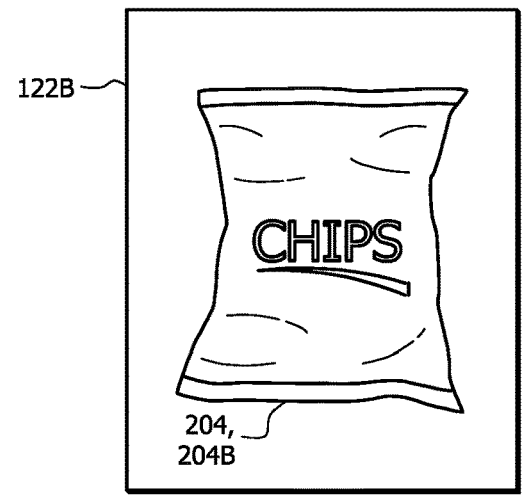
Figure 5C:
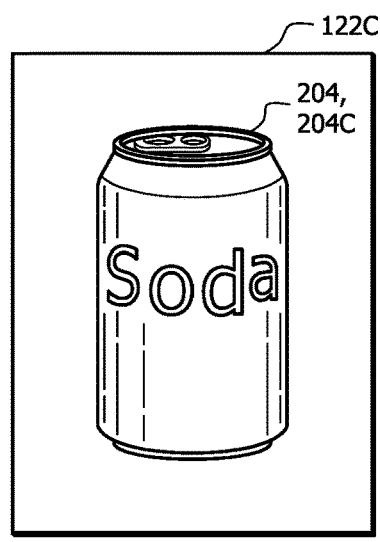

At step 308, the item tracking device 104 captures images 122 of the items 204 on the platform 202 using the identified cameras 108. Here, the item tracking device 104 uses the identified cameras 108 to capture images of the items 204. Referring to FIGS. 5A, 5B, and 5C as examples, the item tracking device 104 may capture a first image 122A of the item 204A, a second image 122B of item 204B, and a third image 122C of item 204C using cameras 108A, 108B, and 108C, respectively. The item tracking device 104 may collect one or more images 122 of each item 204 for processing. By using a subset of the cameras 108 available on the imaging device 102 to capture images of the items 204, the item tracking device 104 is able to reduce the number of images 122 that will be captured and processed to identify the items 204 on the platform 202. This process reduces the search space for identifying items 204 and improves the efficiency and hardware utilization of the item tracking device 104 by allowing the item tracking device 104 to process fewer images 122 to identify the item 204 instead of processing images 122 from all of the cameras 108 on the imaging device 102, which may include multiple images 122 of the same items 204. In addition, the item tracking device 104 also selects cameras 108 that are positioned to capture features that are the most useful for identifying the items 204 based on the orientation and location of the items 204, as discussed in step 306. Examples of features include, but are not limited to, text, logos, branding, colors, barcodes, patterns, a shape, or any other suitable type of attributes of an item 204.

Returning to FIG. 3 at step 310, the item tracking device 104 identifies the items 204 on the platform 202 based on the captured images 122. Here, the item tracking device 104 identifies an item 204 within each image 122 based on the features of the item 204 in the image 122. As an example, the machine learning model 126 may be a CNN. In this example, the machine learning model 126 includes an input layer, an output layer, and one or more hidden layers. The hidden layers include at least one convolution layer. For example, the machine learning model 126 may include the following sequence of layers: input layer, convolution layer, pooling layer, convolution layer, pooling layer, one or more fully connected layers, output layer. Each convolution layer of machine learning model 126 uses a set of convolution kernels to extract features from the pixels that form an image 122. In certain embodiments, the convolution layers of machine learning model 126 are implemented in the frequency domain, and the convolution process is accomplished using discrete Fourier transforms. This may be desirable to reduce the computational time associated with training and using machine learning model 126 for image classification purposes. For example, by converting to the frequency domain, the fast Fourier transform algorithm (FFT) may be implemented to perform the discrete Fourier transforms associated with the convolutions. Not only does the use of the FFT algorithm alone greatly reduce computational times when implemented on a single CPU (as compared with applying convolution kernels in the spatial domain), the FFT algorithm may be parallelized using one or more graphics processing units (GPUs), thereby further reducing computational times. Converting to the frequency domain may also be desirable to help ensure that the machine learning model 126 is translation and rotation invariant (e.g., the assignment made by machine learning model 126 of an image 122 to an item identifier, based on the presence of an item 204 in the image 122, should not depend on the position and/or orientation of the item 204 within image 122).

As another example, the machine learning model 126 may be a supervised learning algorithm. Accordingly, in certain embodiments, item tracking device 104 is configured to train the machine learning model 126 to assign input images 122 to any of a set of predetermined item identifiers. The item tracking device 104 may train the machine learning model 126 in any suitable manner. For example, in certain embodiments, the item tracking device 104 trains the machine learning model 126 by providing the machine learning model 126 with training data (e.g. images 122) that includes a set of labels (e.g. item identifiers) attached to the input images 122. As another example, the machine learning model 126 may be an unsupervised learning algorithm. In such embodiments, the item tracking device 104 is configured to train machine learning model 126 by providing the machine learning model 126 with a collection of images 122 and instructing the machine learning model 126 to classify these images 122 with item identifiers identified by the item tracking device 104, based on common features extracted from the images 122. The item tracking device 104 may train the machine learning model 126 any time before inputting the captured images 122 into the machine learning model 126.

After training the machine learning model 126, the item tracking device 104 may input each of the captured images 122 into the machine learning model 126. In response to inputting an image 122 in the machine learning model 126, the item tracking device 104 receives an item identifier for an item 204 from the machine learning model 126. The item identifier corresponds with an item 204 that was identified within the image 122. Examples of item identifiers include, but are not limited to, an item name, a barcode, an item number, a serial number, or any other suitable type of identifier that uniquely identifies an item 204.

In some embodiments, the item tracking device 104 may employ one or more image processing techniques without using the machine learning model 126 to identify an item 204 within an image 122. For example, the item tracking device 104 may employ object detection and/or optical character recognition (OCR) to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204. After comparing the identified features from an image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may output an item identifier that corresponds with the matching item 204. In other embodiments, the item tracking device 104 may employ one or more image processing techniques in conjunction with the machine learning model 126 to identify an item 204 within an image 122 using any combination of the techniques discussed above.

In some embodiments, the item tracking device 104 is configured to output a confidence score 610 that indicates a probability that an item 204 has been correctly identified. For example, the item tracking device 104 may obtain an confidence score 610 from the machine learning model 126 with the determined item identifier. In this example, the machine learning model 126 outputs a confidence score 610 that is proportional to the number of features that were used or matched when determining the item identifier. As another example, the item tracking device 104 may determine a confidence score 610 based on how well identified features match the features of the identified item 204. For instance, the item tracking device 104 may obtain a confidence score 610 of 50% when half of the text identified within an image 122 matches the text associated with identified item 204. As another example, the item tracking device 104 may determine obtain a confidence score 610 of 100% when a barcode within an image 122 matches a barcode of the identified item 204. As another example, the item tracking device 104 may obtain a confidence score 610 of 25% when the dominant color within an image 122 matches a dominant color of the identified item 204. In other examples, the item tracking device 104 may obtain a confidence score 610 that is based on how well any other suitable type or combination of features matches the features of the identified item 204. Other information that can impact a confidence score 610 include, but are not limited to, the orientation of the object, the number of items on the platform 208 (e.g., a fewer number of items on the platform 208 are easier to identify than a greater number of items on the platform 208); the relative distance between items on the platform (e.g., spaced apart items on the platform 208 are easier to identify than crowded items on the platform 208); and the like. The item tracking device 104 may compare the confidence score 610 for an identified item 204 to a confidence score threshold value 612 to determine whether the item 204 has been identified. The item tracking device 104 may determine that an item 204 has not been identified when the confidence score 610 for the item 204 is less than the confidence score threshold value 612. The item tracking device 104 determines that the item 204 has been identified when the confidence score 610 for the item 204 is greater than or equal to the confidence score threshold value 612. The confidence score threshold value 612 may be set to 90%, 80%, 75%, or any other suitable value.

At step 312, the item tracking device 104 determines whether all of the items 204 on the platform 202 have been identified. For example, the item tracking device 104 may compare the number of identified items 204 from the captured images 122 to the number of items 204 on the platform 202 that was determined in step 304. The item tracking device 104 determines that all of the items 204 on the platform 202 have been identified when the number of items 204 identified items 204 from the captured images 122 matches the determined number of items 204 on the platform 202. Otherwise, the item tracking device 104 determines that at least one of the items 204 has not been identified when the number of items 204 identified items 204 from the captured images 122 does not match the determined number of items 204 on the platform 202.

The item tracking device 104 proceeds to step 314 in response to determining that one or more of the items 204 on the platform 202 have not been identified. In this case, the item tracking device 104 may output a request for the user to reposition one or more items 204 on the platform 202 to assist the item tracking device 104 with identifying some of the items 204 on the platform. At step 314, the item tracking device 104 outputs a prompt to rearrange one or more items 204 on the platform 202. As an example, one or more items 204 may be obscuring the view of an item 204 for one of the cameras 108. In this example, the item tracking device 104 may output a message on a graphical user interface that is located at the imaging device 102 with instructions for the user to rearrange the position of the items 204 on the platform 202. In some embodiments, the item tracking device 104 may also identify the locations of the one or more items 204 on the platform 202 that were not identified. For example, the item tracking device 104 may activate a light source above or below the platform 202 that illuminates an item 204 that was not recognized. In one embodiment, after outputting the message to rearrange the items 204 on the platform 202, the item tracking device 104 returns to step 306 to restart the process of identifying the items 204 on the platform 202. This process prevents the item tracking device 104 from double counting items 204 after the items 204 have been rearranged on the platform 202.

Returning to step 312, the item tracking device 104 proceeds to step 316 in response to determining that all of the items 204 on the platform 202 have been identified. In some embodiments, the item tracking device 104 may validate the accuracy of detecting the identified items 204 based on the weight of the items 204 on the platform 202. For example, the item tracking device 104 may determine a first weight that is associated with the weight of the identified items 204 based on item information 118 that is associated with the identified items 204. For instance, the item tracking device 104 may use item identifiers for the identified items 204 to determine a weight that corresponds with each of the identified items 204. The item tracking device 104 may sum the individual weights for the identified items 204 to determine the first weight. The item tracking device 104 may also receive a second weight for the items 204 on the platform 202 from the weight sensor 112. The item tracking device 104 then determines a weight difference between the first weight and the second weight and compares the weight difference to a weight difference threshold value. The weight difference threshold value corresponds with a maximum weight difference between the first weight and the second weight. When the weight difference exceeds the weight difference threshold value, the item tracking device 104 may determine that there is a mismatch between the weight of the items 204 on the platform 202 of the imaging device 102 and the expected weight of the identified items 204. In this case, the item tracking device 104 may output an error message and/or return to step 306 to restart the item tracking process. When the weight difference is less than or equal to the weight difference threshold value, the item tracking device 104 may determine that there is a match between the weight of the items 204 on the platform 202 of the imaging device 102 and the expected weight of the identified items 204. In this case, the item tracking device 104 may proceed to step 316.

At step 316, the item tracking device 104 checks whether any prohibited or restricted item 204 are present on the platform 202. A prohibited or restricted item 204 is an item 204 that the user is not authorized to obtain due to permission restrictions, age restrictions, or any other type of restrictions. The item tracking device 104 may compare item identifiers for the identified items 204 to a list of item identifiers for restricted or prohibited items 616. In response to determining that an item 204 matches one of the items on the list of restricted or prohibited items 616, the item tracking device 104 proceeds to step 318 to output an alert or notification that indicates that the user is prohibited from obtaining one of the items 204 that is on the platform 202. For example, the item tracking device 104 may output an alert message that identifies the prohibited item 204 and asks the user to remove the prohibited item 204 from the platform 202 using a graphical user interface that is located at the imaging device 102. As another example, the item tracking device 104 may output an alert message that identifies the prohibited item 204 to another user (e.g. an employee) that is associated with the space. In other examples, the item tracking device 104 may output any other suitable type of alert message in response to detecting a prohibited item 204 on the platform 202.

At step 320, the item tracking device 104 determines whether the prohibited item 204 has been removed from the platform 202. For example, the item tracking device 104 may use the weight sensors 112 to determine whether the measured weight of the item 204 on the platform 202 has decreased by an amount that corresponds with the weight of the prohibited item 204. As another example, the item tracking device 104 may use the cameras 108 and/or 3D sensors 110 to determine whether the prohibited item 204 is still present on the platform 202. In response to determining that the prohibited item 204 is still present on the platform 202, the item tracking device 104 may pause process 300 and remain at step 320 until the prohibited item 204 has been removed from the platform 202. This process prevents the user from obtaining the prohibited item 204. The item tracking device 104 may proceed to step 322 after the prohibited item 204 has been removed from the platform 202.

Otherwise, the item tracking device 104 proceeds to step 322 in response to determining that no prohibited items 204 are present on the platform 202. At step 322, the item tracking device 104 associates the items 204 with the user. In one embodiment, the item tracking device 104 may identify the user that is associated with the items 204 on the platform 202. For example, the user may identify themselves using a scanner or card reader that is located at the imaging device 102. Examples of a scanner include, but are not limited to, a QR code scanner, a barcode scanner, a near-field communication (NFC) scanner, or any other suitable type of scanner that can receive an electronic code embedded with information that uniquely identifies a person. In other examples, the user may identify themselves by providing user information on a graphical user interface that is located at the imaging device 102. Examples of user information include, but are not limited to, a name, a phone number, an email address, an identification number, an employee number, an alphanumeric code, or any other suitable type of information that is associated with the user.

The item tracking device 104 uses the information provided by the user to identify an account that is associated with the user and then to add the identified items 204 to the user's account. For example, the item tracking device 104 may use the information provided by the user to identify an account within the user account information 120 that is associated with the user. As an example, the item tracking device 104 may identify a digital cart that is associated with the user. In this example, the digital cart comprises information about items 204 that the user has placed on the platform 202 to purchase. The item tracking device 104 may add the items 204 to the user's digital cart by adding the item identifiers for the identified items 204 to the digital cart. The item tracking device 104 may also add other information to the digital cart that is related to the items 204. For example, the item tracking device 104 may use the item identifiers to look up pricing information for the identified items 204 from the stored item information 118. The item tracking device 104 may then add pricing information that corresponds with each of the identified items 204 to the user's digital cart.

After the item tracking device 104 adds the items 204 to the user's digital cart, the item tracking device 104 may trigger or initiate a transaction for the items 204. In one embodiment, the item tracking device 104 may use previously stored information (e.g. payment card information) to complete the transaction for the items 204. In this case, the user may be automatically charged for the items 204 in their digital cart when they leave the space. In other embodiments, the item tracking device 104 may collect information from the user using a scanner or card reader that is located at the imaging device 102 to complete the transaction for the items 204. This process allows the items 204 to be automatically added to the user's account (e.g. digital cart) without having the user scan or otherwise identify the items 204 they would like to take. After adding the items 204 to the user's account, the item tracking device 104 may output a notification or summary to the user with information about the items 204 that were added to the user's account. For example, the item tracking device 104 may output a summary on a graphical user interface that is located at the imaging device 102. As another example, the item tracking device 104 may output a summary by sending the summary to an email address or a user device that is associated with the user.

Hardware Configuration for the Item Tracking Device

Figure 6:
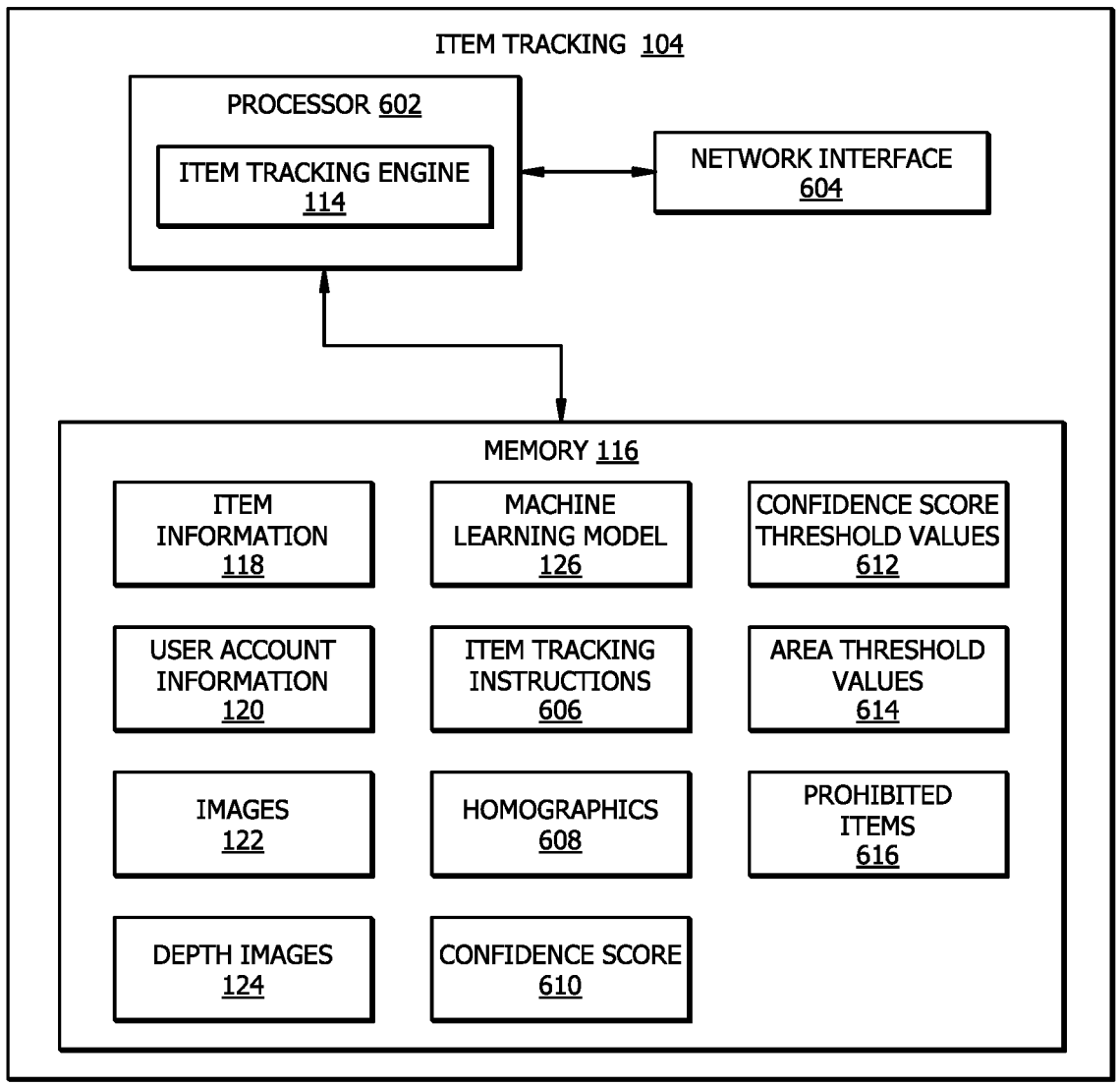
FIG. 6 is an embodiment of an item tracking device configured for the item tracking system.

FIG. 6 is an embodiment of an item tracking device 104 for the item tracking system 100. In one embodiment, the item tracking device 104 may comprise a processor 602, a memory 116, and a network interface 604. The item tracking device 104 may be configured as shown or in any other suitable configuration.

Processor

The processor 602 comprises one or more processors operably coupled to the memory 116. The processor 602 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 116 and the network interface 604. The one or more processors are configured to process data and may be implemented in hardware or software. For example, the processor 602 may be 8-bit, 16-bit, 32-bit, 64-bit, or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute item tracking instructions 606 to implement the item tracking engine 114. In this way, processor 602 may be a special-purpose computer designed to implement the functions disclosed herein. In an embodiment, the item tracking engine 114 is implemented using logic units, FPGAs, ASICs, DSPs, or any other suitable hardware. The item tracking engine 114 is configured to operate as described in FIGS. 1 and 3. For example, the item tracking engine 114 may be configured to perform the steps of process 300 as described in FIG. 3.

Memory

The memory 116 is operable to store any of the information described above with respect to FIGS. 1 and 3 along with any other data, instructions, logic, rules, or code operable to implement the function(s) described herein when executed by the processor 602. The memory 116 comprises one or more disks, tape drives, or solid-state drives, and may be used as an over-flow data storage device, to store programs when such programs are selected for execution, and to store instructions and data that are read during program execution. The memory 116 may be volatile or non-volatile and may comprise a read-only memory (ROM), random-access memory (RAM), ternary content-addressable memory (TCAM), dynamic random-access memory (DRAM), and static random-access memory (SRAM).

The memory 116 is operable to store item tracking instructions 606, item information 118, user account information 120, machine learning models 126, images 122, depth images 124, homographies 608, confidence scores 610, confidence score threshold values 612, area threshold values 614, a list of restricted or prohibited items 616, and/or any other data or instructions. The item tracking instructions 606 may comprise any suitable set of instructions, logic, rules, or code operable to execute the item tracking engine 114. The item information 118, the user account information 120, the machine learning models 126, images 122, depth images 124, homographies 608, confidence scores 610, confidence score threshold values 612, area threshold values 614, and the list of restricted or prohibited items 616 are configured similar to the item information 118, the user account information 120, the machine learning models 126, images 122, depth images 124, homographies 608, confidence scores 610, confidence score threshold values 612, area threshold values 614, and the list of restricted or prohibited items 616 described in FIGS. 1 and 3, respectively.

Network Interface

The network interface 604 is configured to enable wired and/or wireless communications. The network interface 604 is configured to communicate data between the imaging device 102 and other devices, systems, or domains. For example, the network interface 604 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 602 is configured to send and receive data using the network interface 604. The network interface 604 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An item tracking system, comprising:
a plurality of cameras, wherein each camera is configured to capture images of at least a portion of a platform; and
a three-dimensional (3D) sensor positioned above the platform, wherein the 3D sensor is configured to capture overhead depth images of items placed on the platform, wherein each overhead depth image is configured to capture upward-facing surfaces of items placed on the platform;
a memory operable to store user account information for a plurality of users; and
a processor operably coupled to the memory, and configured to:
detect a triggering event at the platform, wherein the triggering event corresponds with a user placing items on the platform;
capture an overhead depth image of a first item and a second item on the platform using the 3D sensor;
determine a first object pose for the first item based at least in part upon the overhead depth image, wherein determining the first object pose comprises determining a first orientation for the first item with respect to the platform;
determine a second object pose for the second item based at least in part upon the overhead depth image, wherein determining the second object pose comprises determining a second orientation for the second item with respect to the platform;
identify a first camera from among the plurality of cameras based at least in part upon the first object pose for the first item;
identify a second camera from among the plurality of cameras based at least in part upon the second object pose for the second item, wherein the second camera is different from the first camera;
capture a first image of the first item using the first camera, wherein:
the first image comprises one or more features of the first item; and
each feature corresponds with a physical attribute of the first item;
capture a second image of the second item using the second camera, wherein:
the second image comprises one or more features of the second item; and
each feature corresponds with a physical attribute of the second item;
identify the first item within the first image based at least in part upon features of the first item;
identify the second item within the second image based at least in part upon features of the second item;
identify the user associated with the first item and the second item;
identify an account within the user account information that is associated with the user; and
associate the first item and the second item with the account of the user.

2. The device of claim 1, further comprising a weight sensor configured to measure a weight for items on the platform; and
wherein detecting the triggering event comprises detecting a weight increase on the weight sensor.

3. The device of claim 1, wherein detecting the triggering event comprises:
capturing a second depth image of the platform;
comparing the second depth image to a reference depth image, wherein the reference depth image is captured when no items are on the platform; and
detecting the first item and the second item based on differences between the second depth image and the reference depth image.

4. The device of claim 1, wherein detecting the triggering event comprises:
capturing an image of the platform;
comparing the image of the platform to a reference image, wherein the reference image is captured when no items are on the platform; and
detecting the first item and the second item based on differences between the image of the platform and the reference image.

5. The device of claim 1, wherein:
the memory is further operable to store a homography associated with the 3D sensor, wherein the homography comprises coefficients that translate between pixel locations in the overhead depth image and physical locations on the platform; and identifying the first camera from among the plurality of cameras comprises:
applying the homography to the overhead depth image to determine a physical location of the first item on the platform;
determining distances between the physical location of the first item and the plurality of cameras; and
selecting the first camera from among the plurality of cameras that is closest to the physical location of the first item.

6. The device of claim 1, further comprising a weight sensor configured to measure a weight for items on the platform;
the memory is further operable to store item information that comprises weights for a plurality of items; and
the processor is further configured to:
determine a first weight associated with the first item and the second item based on the item information associated with the first item and the second item;
receive a second weight for the first item and the second item from the weight sensor;
determine a weight difference between the first weight and the second weight;
determine the weight difference is less than or equal to a weight difference threshold value; and
associate the first item and the second item with the account of the user in response to determining that the weight difference is less than or equal to a weight difference threshold value.

7. The device of claim 1, wherein identifying the first item within the first image comprises:
inputting the first image into a machine learning model that is configured to output an item identifier based on features of an item that are present in an input image; and
receiving a first item identifier for the first item in response to inputting the first image into the machine learning model.

8. The device of claim 1, wherein identifying the first camera from among the plurality of cameras based at least in part upon the first object pose comprises:
determining the first item is in a vertical orientation with respect to the platform; and
selecting the first camera from among the plurality of cameras in response to the determination, wherein the first camera is configured with a perspective view of the platform.

9. The device of claim 1, wherein identifying the first camera from among the plurality of cameras based at least in part upon the first object pose comprises:
determining the first item is in a horizontal orientation with respect to the platform; and
selecting the first camera from among the plurality of cameras in response to the determination, wherein the first camera is configured with an overhead view of the platform.

10. The device of claim 1, wherein determining the first object pose for the first item comprises:
determining an area within the overhead depth image that corresponds with the first item;
comparing the area to a predetermined area threshold value;
determining that the area is less than or equal to the predetermined area threshold value; and
selecting the first camera from among the plurality of cameras in response to the determination, wherein the first camera is configured with a perspective view of the platform.

11. The device of claim 1, wherein determining the first object pose for the first item comprises:
determining an area within the overhead depth image that corresponds with the first item;
comparing the area to a predetermined area threshold value;
determining that the area is greater than the predetermined area threshold value; and
selecting the first camera from among the plurality of cameras in response to the determination, wherein the first camera is configured with an overhead view of the platform.

12. The device of claim 1, wherein the processor is further configured to:
compare item identifiers for the first item and the second item to a list of item identifiers for prohibited items; and
determine that the item identifiers for the first item and the second item do not match any of the item identifiers for prohibited items before associating the first item and the second item with the account of the user.

13. The device of claim 1, wherein identifying the first item within the first image comprises:
obtaining a confidence score that corresponds with a probability that the first item has been correctly identified;
comparing the confidence score to a predetermined confidence score threshold value; and
determining that the confidence score is greater than or equal to the confidence score threshold value.

14. The device of claim 1, wherein:
the memory is further operable to store features for a plurality of items, wherein a feature corresponds with a physical attribute of an item; and
identifying the first item within the first image comprises:
identifying features of the first item from the first image;
comparing the identified features of the first item to the features for the plurality of items;
identifying a third item from among the plurality of matches with features that at least partially match the identified features of the first item; and
associating the first item with an item identifier that corresponds with the third item.

15. An item tracking method, comprising:
detecting a triggering event at a platform, wherein the triggering event corresponds with a user placing items on the platform;
capturing an overhead depth image a first item and a second item on the platform using a three-dimensional (3D) sensor, wherein the overhead depth image is configured to capture upward-facing surfaces of items placed on the platform;
determining a first object pose for the first item based at least in part upon the overhead depth image, wherein determining the first object pose comprises determining a first orientation for the first item with respect to the platform;
determining a second object pose for the second item based at least in part upon the overhead depth image, wherein determining the second object pose comprises determining a second orientation for the second item with respect to the platform;

identifying a first camera from among a plurality of cameras based at least in part upon the first object pose for the first item;

identifying a second camera from among the plurality of cameras base at least in part upon the second object pose for the second camera, wherein the second camera is different from the first camera;

capturing a first image of the first item using the first camera, wherein:
  the first image comprises one or more features of the first item; and
  each feature corresponds with a physical attribute of the first item;

capturing a second image of the second item using the second camera, wherein:
  the second image comprises one or more features of the second item; and
  each feature corresponds with a physical attribute of the second item;

identifying the first item within the first image based at least in part upon features of the first items;

identifying the second item within the second image based at least in part upon the features of the second item;

identifying the user associated with the first item and the second item;

identifying an account that is associated with the user; and associate the first item and the second item with the account of the user.

16. The method of claim 15, wherein:
detecting the triggering event comprises detecting a weight increase on a weight sensor; and
the weight sensor configured to measure a weight for items on the platform.

17. The method of claim 15, wherein detecting the triggering event comprises:
capturing a second depth image of the platform;
comparing the second depth image to a reference depth image, wherein the reference depth image is captured when no items are on the platform; and
detecting first item and the second item based on differences between the second depth image and the reference depth image.

18. The method of claim 15, wherein detecting the triggering event comprises:
capturing an image of the platform;
comparing the image of the platform to a reference image, wherein the reference image is captured when no items are on the platform; and
detecting the first item and the second item based on differences between the image of the platform and the reference image.

19. The method of claim 15, further comprising:
determining a first weight associated with the first item and the second item based on item information associated with the first item and the second item;
receiving a second weight for the first item and the second item from a weight sensor, wherein the weight sensor configured to measure a weight for items on the platform;
determining a weight difference between the first weight and the second weight;
determining the weight difference is less than or equal to a weight difference threshold value; and associating the first item and the second item with the account of the user in response to determining that the weight difference is less than or equal to a weight difference threshold value.

20. The method of claim 15, wherein identifying the first item within the first image comprises:
inputting the first image into a machine learning model that is configured to output an item identifier based on features of an item that are present in an input image; and
receiving a first item identifier for the first item in response to inputting the first image into the machine learning model.

21. The method of claim 15, wherein identifying the first camera from among the plurality of cameras comprises:
applying a homography to the overhead depth image to determine a physical location of the first item on the platform, wherein the homography comprises coefficients that translate between pixel locations in the overhead depth image and physical locations on the platform;
determining distances between the physical location of the first item and the plurality of cameras; and
selecting the first camera from among the plurality of cameras that is closest to the physical location of the first item.

22. The method of claim 15, wherein identifying the first camera from among the plurality of cameras based at least in part upon the first object pose comprises:
determining the first item is in a vertical orientation with respect to the platform; and
selecting the first camera from among the plurality of cameras in response to the determination, wherein the first camera is configured with a perspective view of the platform.

23. The method of claim 15, wherein identifying the first camera from among the plurality of cameras based at least in part upon the first object pose comprises:
determining the first item is in a horizontal orientation with respect to the platform; and
selecting the first camera from among the plurality of cameras in response to the determination, wherein the first camera is configured with an overhead view of the platform.

24. The method of claim 15, wherein determining the first object pose for the first item comprises:
determining an area within the overhead depth image that corresponds with the first item;
comparing the area to a predetermined area threshold value;
determining that the area is less than or equal to the predetermined area threshold value; and
selecting the first camera from among the plurality of cameras in response to the determination, wherein the first camera is configured with a perspective view of the platform.

25. The method of claim 15, wherein determining the first object pose for the first item comprises:
determining an area within the overhead depth image that corresponds with the first item;
comparing the area to a predetermined area threshold value;
determining that the area is greater than the predetermined area threshold value; and selecting the first camera from among the plurality of cameras in response to the determination, wherein the first camera is configured with an overhead view of the platform.

26. The method of claim 15, further comprising:
comparing item identifiers for the first item and the second item to a list of item identifiers for prohibited items; and
determining that the item identifiers for the first item and the second item do not match any of the item identifiers for prohibited items before associating the first item and the second item with the account of the user.

27. The method of claim 15, wherein identifying the first item within the first image comprises:
obtaining a confidence score that corresponds with a probability that the first item has been correctly identified;
comparing the confidence score to a predetermined confidence score threshold value; and
determining that the confidence score is greater than or equal to the confidence score threshold value.

28. The method of claim 15, wherein identifying the first item within the first image comprises:
identifying features of the first item from the first image;
comparing the identified features of the first item to features for the plurality of items stored in a memory;
identifying a third item from among the plurality of matches with features that at least partially match the identified features of the first item; and
associating the first item with an item identifier that corresponds with the third item.

29. A computer program product comprising executable instructions stored in a non-transitory computer-readable medium that when executed by a processor causes the processor to:
detect a triggering event at a platform, wherein the triggering event corresponds with a user placing items on the platform;
capture an overhead depth image a first item and a second item on the platform using a three-dimensional (3D) sensor, wherein the overhead depth image is configured to capture upward-facing surfaces of items placed on the platform;
determine a first object pose for the first item based at least in part upon the overhead depth image, wherein determining the first object pose comprises determining a first orientation for the first item with respect to the platform;
determine a second object pose for the second item based at least in part upon the overhead depth image, wherein determining the second object pose comprises determining a second orientation for the second item with respect to the platform;
identify a first camera from among a plurality of cameras based at least in part upon the first object pose for the first item;
identify a second camera from among the plurality of camera based at least in part upon the second object pose for the second item, wherein the second camera is different from the first camera;
capture a first image of the first item using the first camera, wherein:
the first image comprises one or more features of the first item; and
each feature corresponds with a physical attribute of the first item;
capture a second image of the second item using the second camera, wherein:
the second image comprises one or more features of the second item; and
each feature corresponds with a physical attribute of the second item;
identify the first item within the first image based at least in part upon features of the first items;
identify a second item within the second image based at least in part upon the features of the second item;
identify the user associated with the first item and the second item on the platform;
identify an account that is associated with the user; and
associate the first item and the second item with the account of the user.

30. The computer program product of claim 29, wherein:
detecting the triggering event comprises detecting a weight increase on a weight sensor; and
the weight sensor configured to measure a weight for items on the platform.

31. The computer program product of claim 29, wherein detecting the triggering event comprises:
capturing a second depth image of the platform;
comparing the second depth image to a reference depth image, wherein the reference depth image is captured when no items are on the platform; and
detecting first item and the second item based on differences between the second depth image and the reference depth image.

32. The computer program product of claim 29, wherein detecting the triggering event comprises:
capturing an image of the platform;
comparing the image of the platform to a reference image, wherein the reference image is captured when no items are on the platform; and
detecting the first item and the second item based on differences between the image of the platform and the reference image.

33. The computer program product of claim 29, further comprising instructions that when executed by the processor causes the processor to:
determining a first weight associated with the first item and the second item based on item information associated with the first item and the second item;
receiving a second weight for the first item and the second item from a weight sensor, wherein the weight sensor configured to measure a weight for items on the platform;
determining a weight difference between the first weight and the second weight;
determining the weight difference is less than or equal to a weight difference threshold value; and
associating the first item and the second item with the account of the user in response to determining that the weight difference is less than or equal to a weight difference threshold value.

34. The computer program product of claim 29, wherein identifying the first item within the first image comprises:
inputting the first image into a machine learning model that is configured to output an item identifier based on features of an item that are present in an input image; and
receiving a first item identifier for the first item in response to inputting the first image into the machine learning model.

35. The computer program product of claim 29, wherein identifying the first camera from among the plurality of cameras comprises:
- applying a homography to the overhead depth image to determine a physical location of the first item on the platform, wherein the homography comprises coefficients that translate between pixel locations in the overhead depth image and physical locations on the platform;
- determining distances between the physical location of the first item and the plurality of cameras; and
- selecting the first camera from among the plurality of cameras that is closest to the physical location of the first item.

36. The computer program product of claim 29, wherein identifying the first camera from among the plurality of cameras based at least in part upon the first object pose comprises:
- determining the first item is in a vertical orientation with respect to the platform; and
- selecting the first camera from among the plurality of cameras in response to the determination, wherein the first camera is configured with a perspective view of the platform.

37. The computer program product of claim 29, wherein identifying the first camera from among the plurality of cameras based at least in part upon the first object pose comprises:
- determining the first item is in a horizontal orientation with respect to the platform; and
- selecting the first camera from among the plurality of cameras in response to the determination, wherein the first camera is configured with an overhead view of the platform.

38. The computer program product of claim 29, wherein determining the first object pose for the first item comprises:
- determining an area within the overhead depth image that corresponds with the first item;
- comparing the area to a predetermined area threshold value;
- determining that the area is less than or equal to the predetermined area threshold value; and
- selecting the first camera from among the plurality of cameras in response to the determination, wherein the first camera is configured with a perspective view of the platform.

39. The computer program product of claim 29, wherein determining the first object pose for the first item comprises:
- determining an area within the overhead depth image that corresponds with the first item;
- comparing the area to a predetermined area threshold value;
- determining that the area is greater than the predetermined area threshold value; and
- selecting the first camera from among the plurality of cameras in response to the determination, wherein the first camera is configured with an overhead view of the platform.

40. The computer program product of claim 29, further comprising instructions that when executed by the processor causes the processor to:
- comparing item identifiers for the first item and the second item to a list of item identifiers for prohibited items; and
- determining that the item identifiers for the first item and the second item do not match any of the item identifiers for prohibited items before associating the first item and the second item with the account of the user.

41. The computer program product of claim 29, wherein identifying the first item within the first image comprises:
- obtaining a confidence score that corresponds with a probability that the first item has been correctly identified;
- comparing the confidence score to a predetermined confidence score threshold value; and
- determining that the confidence score is greater than or equal to the confidence score threshold value.

42. The computer program product of claim 29, wherein identifying the first item within the first image comprises:
- identifying features of the first item from the first image;
- comparing the identified features of the first item to features for the plurality of items stored in a memory;
- identifying a third item from among the plurality of matches with features that at least partially match the identified features of the first item; and
- associating the first item with an item identifier that corresponds with the third item.

* * * * *